J. H. UBELAKER.
SELF CLEANING RAKE.
APPLICATION FILED FEB. 6, 1915.
1,155,174.
Patented Sept. 28, 1915.
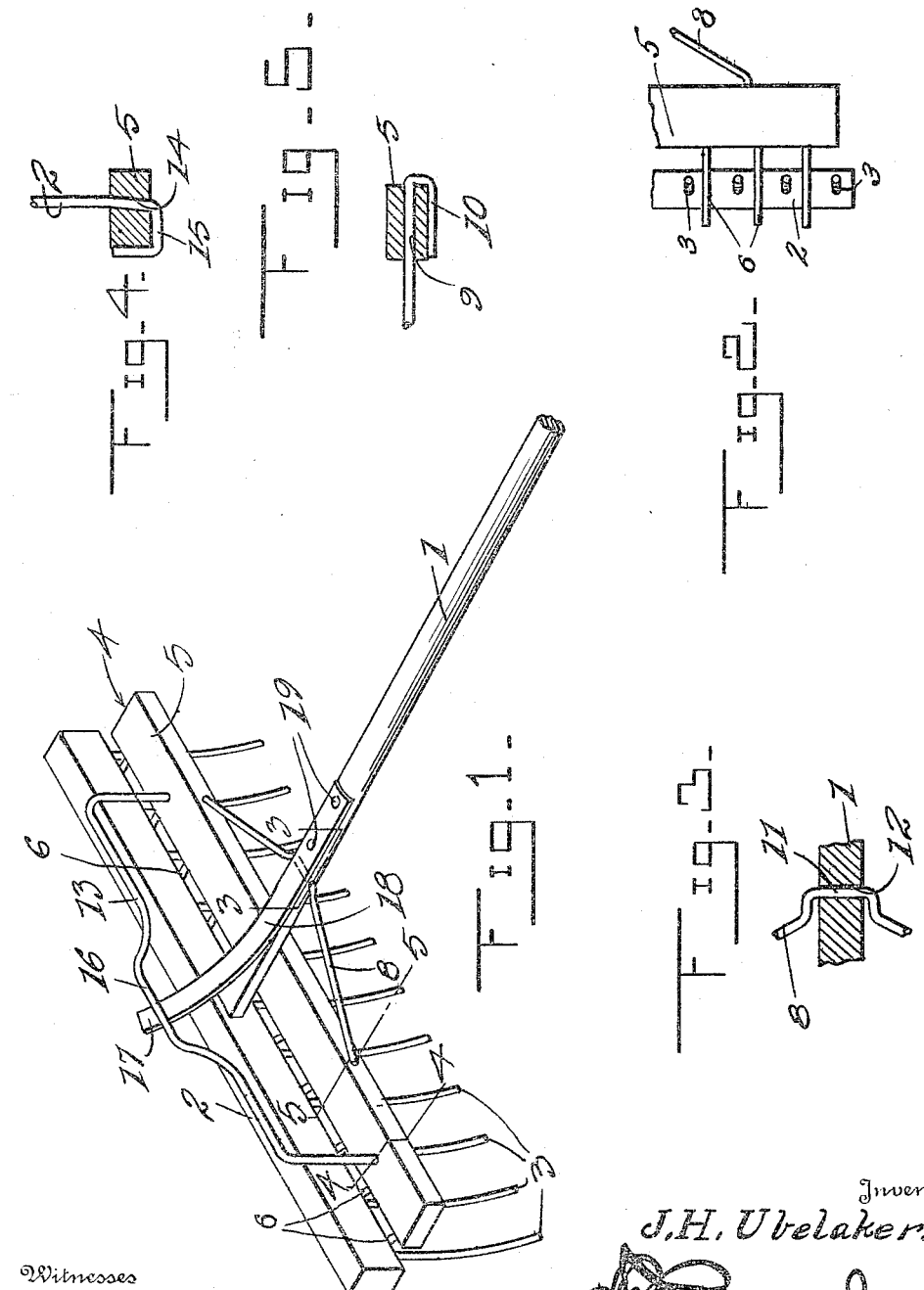

UNITED STATES PATENT OFFICE.

JOSEPH H. UBELAKER, OF CHICAGO, ILLINOIS.

SELF-CLEANING RAKE.

1,155,174.  Specification of Letters Patent.  Patented Sept. 28, 1915.

Application filed February 6, 1915. Serial No. 6,519.

*To all whom it may concern:*

Be it known that I, JOSEPH H. UBELAKER, a subject of the Emperor of Austria-Hungary, residing at Chicago, in the county of Cook and State of Illinois, have invented certain new and useful Improvements in Self-Cleaning Rakes; and I do hereby declare the following to be a full, clear, and exact description of the invention, such as will enable others skilled in the art to which it appertains to make and use the same.

This invention relates to new and useful improvements in self-cleaning rakes, and has for its principal object to provide a rake which may be easily cleaned without necessitating the use of the hands.

Another object of the invention is to provide a means for easily and quickly removing the trash or other accumulation from the teeth of the rake to enable the same to be used without interference in any way.

A further object of the invention is to provide a cleaning attachment which may be applied to a rake and which may be held in operative position thereon at all times so that the rake may be cleaned regardless of the location of the user.

With these and other objects in view, the invention consists in the novel combination and arrangement of parts which will be fully set forth in the following specification and accompanying drawings, in which, Figure 1 is a detail perspective view of a fragment of a rake illustrating this improved cleaner applied thereto, Fig. 2 is a fragmentary view of the under side of the rake showing the cleaner in place, Fig. 3 is a detail sectional view taken on line 3—3 of Fig. 1, Fig. 4 is a detail sectional view taken on line 4—4 of Fig. 1 of the stripping bar, and Fig. 5 is a sectional view taken on line 5—5 of Fig. 1.

Referring to the drawings by characters of reference, the numeral 1 designates the handle of the rake carrying at its forward end the usual head 2. This head is provided with the ordinary teeth 3 which extend downwardly therefrom, and these teeth are preferably curved rearwardly as clearly shown in Fig. 1. The cleaning mechanism which is designated generally by the numeral 4, is illustrated in place in Fig. 1 and will be more fully hereinafter described.

The cleaning mechanism above referred to comprises the stripping bar 5 having secured thereto the forwardly extending teeth 6 which project into the spaces between the teeth 3 of the rake and are arranged to force the trash or other foreign matter gathered therein from the ends of the teeth. Secured to this stripping bar is a suitable bail 8, the ends of which project through the apertures 9 and are bent back upon themselves as at 10 to form a rigid joint. This bail is provided with the offset portion 11 intermediate its ends which extends through a suitable aperture 12 formed in the rake handle. It will thus be seen that a pivotal connection is provided between the stripping bar and the rake handle which will permit the stripping bar to freely swing downwardly toward the ends of the rake teeth when the device is in use. A similar bail 13 is secured to the stripping bar, and the ends of this bail extend through the apertures 14 and are bent as at 15 to form a tight joint therebetween, and this bail is formed intermediate its ends with the upstanding offset portion 16 which engages the upper face of the upturned end 17 of the spring 18 which is riveted or otherwise secured as at 19 to the rake handle.

It will be apparent from the foregoing that in use the rake, in case it becomes clogged with trash or other foreign matter, is turned so that the teeth project upwardly and upon bearing downwardly on the rake handle it will be apparent that the portion 16 of the bail 13 will engage the surface of the ground and force the stripping bar 5 toward the ends of the rake teeth. In this way it will be clearly seen that the teeth 6 will force the trash from the ends of the rake teeth 3 and leave the said rake in condition to be used.

While in the foregoing there has been shown and described the preferred embodiment of this invention, it is to be understood that such changes may be made in the combination and arrangement of parts as will fall within the spirit and scope of the invention as defined in the appended claims.

What is claimed is:

1. A rake cleaner including the combination with a rake, of a stripping bar, a bail carried by the stripping bar and pivoted to the handle of the rake, a second bail secured to the stripping bar and extending upwardly therefrom and bridging the handle of the rake, a spring carried by the rake handle and engaging the under side of the second bail to hold the stripping bar against the rake head, and means extending forwardly from the stripping bar and between the rake teeth to force the trash from the ends thereof when the stripping bar is moved downwardly.

2. In combination, a rake including a handle, a head, and teeth secured to the head, a stripping bar, teeth secured to the stripping bar and extending forwardly therefrom and between the teeth of the rake, a bail secured to the stripping bar and pivoted to the handle at a point in the rear of the rake head, a spring secured to the handle, the forward end of the spring being upturned, a second bail secured to the stripping bar and overlying the spring, the second bail being arranged to engage the spring and hold the stripping bar in its raised position, and means to secure the bails to the stripping bar.

In testimony whereof I affix my signature in presence of two witnesses.

JOSEPH H. UBELAKER.

Witnesses:
ANTON VANEK,
FRANK ZUNF.

Copies of this patent may be obtained for five cents each, by addressing the "Commissioner of Patents, Washington, D. C."